Dec. 11, 1962   E. J. H. FIALA   3,068,022
WHEEL SUSPENSION WITH OSCILLATION DAMPER FOR MOTOR VEHICLES
Filed March 25, 1958

INVENTOR.
ERNST J. H. FIALA
BY Dicke and Craig
ATTORNEYS

United States Patent Office 3,068,022
Patented Dec. 11, 1962

3,068,022
WHEEL SUSPENSION WITH OSCILLATION
DAMPER FOR MOTOR VEHICLES
Ernst J. H. Fiala, Sindelfingen, Kreis Boblingen, Germany, assignor to Daimler-Benz Aktiengesellschaft, Stuttgart-Unterturkheim, Germany
Filed Mar. 25, 1958, Ser. No. 723,826
Claims priority, application Germany Apr. 3, 1957
15 Claims. (Cl. 280—124)

The present invention relates to an arrangement for damping vibrations in spring-suspended vehicle wheels, especially of motor vehicles, whereby a vibration-dissipator or annihilator is coordinated to or operatively connected with the vehicle wheel.

It is known in the prior art to utilize, for purposes of damping vibrations or oscillations in machines or machine parts, inertia damping devices, namely so-called vibration-dissipators or annihilators.

Furthermore, vibration annihilators or dissipators have been used already with motor vehicles for purposes of damping the wheel movements, i.e., the swinging movements tthereof. The vibration-annihilators or dissipators enable an effective damping action of the wheel movements within the wheel suspension itself without transmitting thereby any strong forces into the vehicle.

The present invention aims at a further improvement of wheel suspension provided with vibration-dissipating or annihilating means for effectively reducing the swinging movements of the wheels.

Such an improvement is achieved in accordance with the present invention in that the unsprung mass which appertains to the vehicle wheel of the entire vibration-annihilator or dissipator, i.e., of the spring element and of the appertaining damping element thereof, is smaller than the dissipating or annihilating inertia or mass thereof.

Accordingly, it is an object of the present invention to provide improved means to dissipate the energy derived from the swinging movements of a wheel within the wheel suspension itself.

It is another object of the present invention to provide a wheel suspension, particularly independent wheel suspension, which includes a dissipator or annihilator whose mass is so distributed that the unsprung part thereof which falls on the wheel is very much smaller than the spring-suspended part thereof which constitutes the energy dissipator or annihilator mass, properly speaking.

Still another object of the present invention is the provision of a spring suspension for a motor vehicle wheel which is compact in structure, which exhibits improved operational characteristics and which minimizes the total unsprung mass thereof though effectively damping within the wheel suspension the swinging movements of the wheel.

A further object of the present invention resides in the provision of a vibration dissipator or annihilator within a wheel suspension, which may be readily tuned to damp in particular any desired frequency of vibrations or swinging movements, especially those corresponding to the natural frequency of the wheel suspension.

These and other objects, features and advantages of the present invention will become more obvious from the following description when taken in connection with the accompanying drawing, which shows, for purposes of illustration only, several embodiments in accordance with the present invention, and wherein.

The term "superstructure" is used herein to designate the relatively stationary part, such as the frame or body of a self-supporting body construction, from which the wheel suspension is normally spring suspended.

Figure 1:
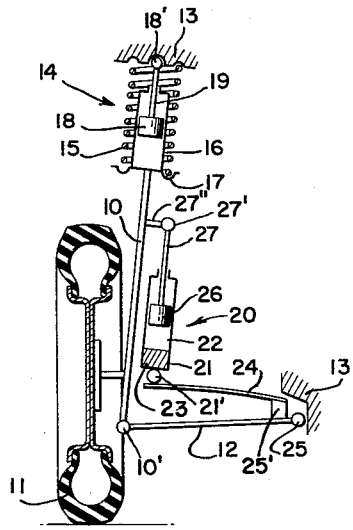
FIGURE 1 is a schematic view, partially in cross section, of a first embodiment of a wheel suspension in accordance with the present invention.

Referring now to the drawing, wherein like reference numerals are used throughout the various views thereof to designate like parts, and more particularly to FIGURE 1, reference numeral 10 designates therein the wheel carrier of any suitable conventional construction which carries the vehicle wheel 11. The wheel carrier 10 is pivotally supported on the vehicle superstructure 13, such as at a longitudinal or transverse frame member, by means of a lower transverse guide member 12 at the lower end 10' thereof and by means of a spring support generally designated by reference numeral 14 at the upper end thereof. A coil spring 15 or any other suitable spring may serve as spring support 14 to which may be coordinated a shock absorber 16 in a manner known per se. The spring 15 is disposed concentrically about the shock absorber 16 and is connected over the dish-shaped spring support 17 with the housing of the shock absorber 16 and simultaneously therewith with the wheel carrier 10. The shock absorber piston 18 is pivotally connected at point 18' with the vehicle superstructure 13 by means of the piston rod 19 thereof.

The vibration dissipator or annihilator is located directly adjacent the wheel carrier 10 and consists of inertia means generally designated by reference numeral 20, and of a spring element 24. The annihilator may be constrcted in the manner of a shock absorber. The dissipator or annihilator mass is thereby constituted by the shock absorber housing 21 together with the filling 22 thereof, to which may possibly be coordinated or added a separate additional inertia or mass element 23. This dissipator or annihilator mass is pivotally connected to the dissipator or annihilator spring 24 at point 21' and through spring 24 with the lower transverse guide member 12 or with any other suitable part of the wheel suspension. Appropriately, the spring 24 may be connected or clamped under tension to the transverse guide member 12 at point 25' in direct proximity to the pivotal connection 25 thereof at the superstructure 13. The shock absorber piston 26 is pivotally secured to the wheel carrier 10 over the piston rod 27 thereof. The piston rod 27 is pivotally connected at pont 27' to a member 27" which is secured to the wheel carrier 10.

Consequently, only the by-far smaller part of the total mass of the shock absorber, namely, the damping piston 26 with the piston rod 27 thereof, belongs to the unsprung mass of the vibration dissipator or annihilator inertia means 20.

The principal or main part of the mass, which may be additionally increased, forms the dissipator or annihilator mass. However, since the latter is connected with the wheel suspension over the dissipator or annihilator spring 24, it no longer counts as unsprung mass.

Figures 3, 4:
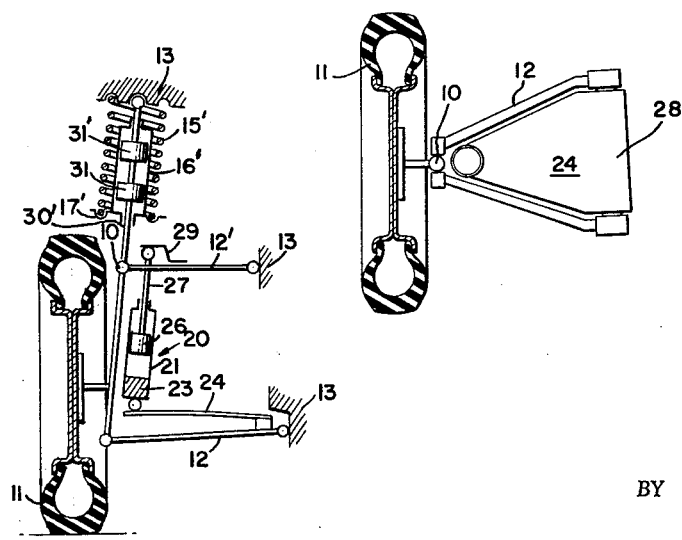
FIGURE 3 is a schematic top plan view of the construction and arrangement of a dissipator or annihilator spring in accordance with the present invention.
FIGURE 4 is a schematic view, partially in cross-section, of a third embodiment of a wheel suspension in accordance with the present invention.

The dissipator or annihilator spring 24 may be constructed, as shown in FIGURE 3, as leaf spring in the form of an isosceles triangle. The spring 24 is thereby preferably located between the two arms of the lower guide member 12 which may be constructed as a triangular guide member. The base of the triangle of guide member 12 may thereby be the place where the spring 24 is secured, under pretension, if so desired, whereas the dissipator or annihilator mass may be secured to the top or apex of the triangle of spring 24.

However, the present invention is not limited to the leaf spring illustrated in FIGURE 3 but is susceptible of many modifications concerning the type and arrangement of the dissipator spring 24.

Figure 2:
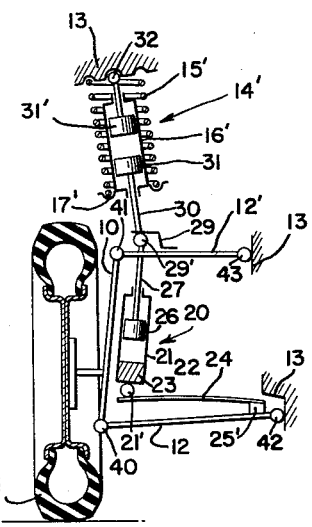
FIGURE 2 is a schematic view, partially in cross section, of a second embodiment of a wheel suspension in accordance with the present invention.

FIGURE 2 illustrates an embodiment which in principle is similar to FIGURE 1. However, in the embodiment of FIGURE 2, the wheel carrier 10 is pivotally secured to the vehicle superstructure 13 by means of a lower transverse guide arm 12 and an upper transverse guide arm 12' which are pivotally connected to the wheel carrier 10 at points 40 and 41, respectively, and to the superstructure at points 42 and 43, respectively. The shock absorber again consists of an inertia means generally designated by reference numeral 20 and annihilator spring 24. The shock absorber is constructed as described hereinabove. The piston rod 27 of piston 26 which forms the unsprung mass of the inertia means 20, however, is supported in an angularly-shaped abutment or support member 29 at point 29' of or secured to the upper transverse guide arm 12'. The spring element generally designated by reference numeral 14' of the wheel suspension which serves as spring support acts at or is operatively connected with the same point 29'. The spring support 14' may also be constructed like spring support 14 of FIGURE 1.

However, the spring support 14' may also be constructed slightly different therefrom in that the coil spring 15' may be arranged on the dish-shaped spring support 17' provided on the housing 16' of a shock absorber and not on the wheel carrier 10. Two piston members 31 and 31' are then present in shock absorber 16' and are pivotally connected, respectively, to the wheel suspension means at point 29' and to the superstructure at point 32. Piston member 31 is a supporting piston and contains no throttling means. Piston member 31', however, is a standard absorber piston and includes the conventional throttle openings. The load of the wheel 11 is thereby transmitted to the lower piston member 31 through wheel carrier 10, guide arm 12', support member 29 and piston rod 30 and is thereby introduced or transmitted directly into the damping medium, for example, into the oil of the shock absorber 16'. Piston rod 30 may also be directly connected to the wheel carrier 10 as illustrated in FIGURE 4 by piston rod 30' which is directly connected to wheel carrier 10. The transmission to the coil spring 15', therefore, takes place only indirectly. As a result of such an arrangement, the damping medium is always at a pressure corresponding to the vehicle weight so that the formation of any vaporization bubbles is rendered impossible. Furthermore, in order to compensate for leakage losses within shock absorber 16', a pump (not shown) of any suitable construction may be operatively connected therewith.

Both embodiments of FIGURES 1 and 2 have in common the operation of the vibration annihilator or dissipator. The mass or inertia of the annihilator or dissipator swings essentially in counterphase to the swinging movements of the wheel and dissipates in that manner the energy of the swinging movements.

By appropriately selecting or adjusting the annihilator or dissipator spring 24 and by appropriately damping the mass or ineria of the annihilator or dissipator, the latter may be tuned to certain frequencies to be particularly damped, for example, to the natural frequency of the wheel suspension.

The term vibration-annihilator or dissipator is used herein though the function of the corresponding structure in accordance with the present invention serves to damp primarily the swinging movements of the vehicle wheels.

While I have shown and described several embodiments in accordance with the present invention, it is understood that the same is not limited thereto but is susceptible of many changes and modifications within the scope and spirit of the present invention, and I, therefore, intend to cover all such changes and modifications as encompassed by the appended claims.

I claim:
1. An arrangement for damping vibrations and swinging movements of spring-suspended wheels of a vehicle having a superstructure, and means for spring suspending a wheel on said superstructure including annihilator means for dissipating the energy of the swinging movements and consisting of one portion thereof operatively connected with said wheel, annihilator spring means and another portion thereof constituting the annihilator mass supported by said spring means, the mass of said one portion being smaller than the mass of said another portion, said spring suspension means including a pivotal connection at said superstructure, and said annihilator spring means being operatively connected with said spring suspending means in direct proximity of said pivotal connection at said superstructure.

2. An arrangement for damping vibrations and swinging movements of spring-suspended wheels of a vehicle according to claim 1, wherein said annihilator spring means is constructed as an essentially triangular leaf spring secured to said suspension means at the base of said triangle, and wherein the annihilator mass is connected to the point of the triangle of said leaf spring.

3. An arrangement for damping vibrations and swinging movements of spring-suspended wheels of a vehicle according to claim 2, wherein said leaf spring is connected with said suspension means under pretension.

4. An arrangement for dampening vibrations and swinging movements of spring-suspended wheels of a vehicle having a superstructure, and means for spring-suspending a wheel from said superstructure including a wheel carrier, a fluid-type shock absorber having two piston members and a spring, one of said piston members being operatively connected with said wheel carrier and the other of said piston members and said spring being supported at said superstructure, and annihilator means for dissipating the energy of the swinging movements and consisting of one portion thereof operatively connected with said wheel, annihilator spring means and another portion thereof constituting the annihilator mass supported by said spring means, the mass of said one portion being smaller than the mass of said another portion.

5. An arrangement for damping vibrations and swinging movements of spring-suspended wheels of a vehicle according to claim 4, wherein said wheel carrier is directly connected with said one piston member.

6. An arrangement for damping vibrations and swinging movements of spring-suspended wheels of a vehicle according to claim 4, wherein said suspension means further comprises a guide arm connecting said wheel carrier to said one piston member.

7. An arrangement for dampening vibrations and swinging movements of spring-suspended wheels of a vehicle having a superstructure, and means for spring-suspending a wheel from said superstructure including dynamic annihilator means for dissipating the energy of the swinging movements and consisting of annihilator spring means and of inertia means, said inertia means including an unsprung portion operatively connected with said wheel and a second portion constituting the annihilator mass and being supported by said annihilator spring means, the mass of said unsprung portion of the inertia means being smaller than the mass of the portion of said inertia means constituting the annihilator mass, and said annihilator spring means being constructed as a leaf spring supported at one end thereof adjacent said superstructure and supporting the annihilator mass at the other end thereof.

8. An arrangement for dampening vibrations and swinging movements of spring-suspended wheels of a vehicle according to claim 7, wherein said spring-suspending means includes a wheel carrier for said wheel, and wherein said annihilator means includes a shock absorber located in direct proximity to said wheel carrier and comprising a piston member, a piston rod operatively connecting said piston member with said wheel carrier, and a shock absorber housing operatively connected with said annihilator spring means, said piston member and said piston rod constituting the unsprung portion of said inertia means and the shock absorber housing and the fluid filling thereof constituting the annihilator mass.

9. An arrangement for dampening vibrations and swinging movements of spring-suspended wheels of a vehicle according to claim 8, wherein said suspension means includes a fluid-tight shock absorber operatively connected with said wheel carrier and including at least one piston member and a spring, said piston member and said spring being supported on said super structure.

10. An arrangement for dampening vibrations and swinging movements of spring-suspended wheels of a vehicle according to claim 9, wherein said fluid-tight shock absorber includes two piston members and a spring, one of said piston members being operatively connected with said wheel carrier, and the other of said piston members and said spring being supported on said superstructure.

11. An arrangement for damping vibrations and swinging movements of spring-suspended wheels of a vehicle having a superstructure, and means for spring-suspending wheels from said superstructure comprising dynamic annihilator means for dissipating the energy of the swinging movements and consisting of an annihilator spring means secured to and supported by said wheel spring-suspending means and inertia means, said inertia means including a first portion constituting the annihilator mass, said first portion being supported by said annihilator spring means, and an unsprung portion separately connected with said wheel-suspending means, the mass of said unsprung portion of said inertia means being smaller than the mass of said first portion thereof.

12. An arrangement as defined in claim 11, wherein said inertia means is a shock absorber including a piston member, piston rod means connecting said piston member to said wheel spring-suspending means, and a fluid-filled housing for said piston member connected with said annihilator spring, said piston member and said piston rod means forming said unsprung portion of the inertia means, and said housing and the fluid filling thereof forming said annihilator mass.

13. An arrangement as defined in claim 12, further including additional inertial means connected with said housing and also forming a part of said annihilator mass.

14. An arrangement for damping vibrations and swinging movements of spring-suspended wheels of a vehicle having a superstructure, comprising means for spring-suspending a wheel from said superstructure including wheel carrier means and means operatively connecting said wheel carrier means and said superstructure, said last-mentioned means including spring means connected to said superstructure for absorbing the vehicle load and shock-absorber means coordinated to said spring means for spring-supporting said wheel carrier means on said superstructure including a cylinder connected to said wheel carrier means and a piston member arranged within said cylinder and supported from said superstructure, said spring means being secured to said cylinder, and dynamic annihilator means for dissipating the energy of the swinging movements of said wheel consisting of an annihilator spring means secured to and supported by said wheel carrier means and inertia means, said inertia means including a first portion constituting the annihilator mass, said first portion being supported by said annihilator spring means and an unsprung portion separately connected to said wheel carrier means, the mass of said unsprung portion of the inertia means being smaller than the mass of said first portion thereof.

15. An arrangement for damping vibrations and swinging movements of spring-suspended wheels of a vehicle having a superstructure and means for spring-suspending a wheel from said superstructure including wheel carrier means, comprising dynamic annihilator means for dissipating the energy of said swinging movements consisting of an inertia means including an unsprung portion connected with said wheel carrier means and a second portion constituting the annihilator mass, and an annihilator spring separately secured to and supported by said wheel carrier means, said annihilator spring means supporting said annihilator mass of the inertia means on said wheel carrier means and performing spring movements only in response to movements of said annihilator mass relative to said unsprung portion of the inertia means, the mass of said unsprung portion being smaller than the mass of said second portion of the inertia means.

References Cited in the file of this patent

UNITED STATES PATENTS

| | | |
|---|---|---|
| 2,621,919 | Utz | Dec. 16, 1952 |
| 2,650,108 | Bruce | Aug. 25, 1953 |
| 2,833,552 | Polhemus | May 6, 1958 |
| 2,865,651 | Chayne | Dec. 23, 1958 |
| 2,917,303 | Vierling | Dec. 15, 1959 |